(12) United States Patent
Schwalenberg

(10) Patent No.: US 10,481,372 B2
(45) Date of Patent: Nov. 19, 2019

(54) LENS AND FLASH

(71) Applicant: OSRAM Opto Semiconductors GmbH, Regensburg (DE)

(72) Inventor: Simon Schwalenberg, Brennberg (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 16/098,240

(22) PCT Filed: May 29, 2017

(86) PCT No.: PCT/EP2017/062909
§ 371 (c)(1),
(2) Date: Nov. 1, 2018

(87) PCT Pub. No.: WO2017/207497
PCT Pub. Date: Dec. 7, 2017

(65) Prior Publication Data
US 2019/0146199 A1    May 16, 2019

(30) Foreign Application Priority Data

May 30, 2016   (DE) .................. 10 2016 109 917

(51) Int. Cl.
*G02B 19/00* (2006.01)
*F21V 5/00* (2018.01)
(Continued)

(52) U.S. Cl.
CPC .......... *G02B 19/0009* (2013.01); *F21V 5/004* (2013.01); *G02B 3/0037* (2013.01);
(Continued)

(58) Field of Classification Search
CPC ...... G02B 27/123; G02B 3/08; G02B 3/0037; G02B 19/0028; G02B 27/0955; G02B 19/0066; F21V 5/004; G03B 2215/0592
See application file for complete search history.

(56) References Cited

U.S. PATENT DOCUMENTS 4,848,319 A * 7/1989 Appeldorn ............. F24S 23/31
126/700
5,914,760 A * 6/1999 Daiku .................... G02B 3/005
349/65
(Continued)

FOREIGN PATENT DOCUMENTS

DE   102007056402 A1   5/2009
DE   102012008640 A1   11/2013
(Continued)

*Primary Examiner* — Donald L Raleigh
(74) *Attorney, Agent, or Firm* — Slater Matsil, LLP

(57) ABSTRACT

A lens and a flash are disclosed. In an embodiment a lens includes a light entrance side having a plurality of Fresnel elements, a light exit side having a plurality of exit lenses having a second focal length and an optical axis, wherein the Fresnel elements and the exit lenses are optically associated with one another in a one-to-one manner, wherein each Fresnel element has an entrance surface which is convex in shape and which forms an entrance lens having a first focal length, wherein each Fresnel element has a deflection surface arranged directly downstream of the entrance surface, wherein the deflection surface is configured to deflect the light which entered the lens through the entrance surface by total internal reflection towards an associated exit lens, and wherein, with a tolerance, each entrance surface and the associated exit lens are located in the interrelated focal points.

14 Claims, 7 Drawing Sheets

(51) Int. Cl.
  *G02B 27/09* (2006.01)
  *G03B 15/05* (2006.01)
  *G02B 3/00* (2006.01)
  *G02B 3/08* (2006.01)
  *G02B 27/10* (2006.01)
  *G02B 27/12* (2006.01)

(52) U.S. Cl.
  CPC .......... *G02B 3/08* (2013.01); *G02B 19/0028* (2013.01); *G02B 19/0066* (2013.01); *G02B 27/0955* (2013.01); *G02B 27/1006* (2013.01); *G02B 27/123* (2013.01); *G03B 15/05* (2013.01); *G03B 2215/0592* (2013.01)

(56) References Cited

U.S. PATENT DOCUMENTS 8,757,849 B2  6/2014  Brick et al.
2007/0012934 A1*  1/2007  Abu-Ageel ............ G02B 5/045
                                             257/95
2009/0279092 A1  11/2009  Tsao
2010/0002320 A1*  1/2010  Minano .................... F21V 7/04
                                             359/850
2010/0080002 A1  4/2010  Kadar-Kallen
2013/0058085 A1  3/2013  Lee et al.
2015/0110970 A1  4/2015  Peil et al.
2016/0072030 A1  3/2016  Streppel
2017/0336527 A1*  11/2017  Hu .......................... G01V 8/10
2017/0336539 A1*  11/2017  Perreault ................. G02B 3/08

FOREIGN PATENT DOCUMENTS

DE     102014112891 A1   3/2016
WO       2009151647 A2   12/2009

* cited by examiner

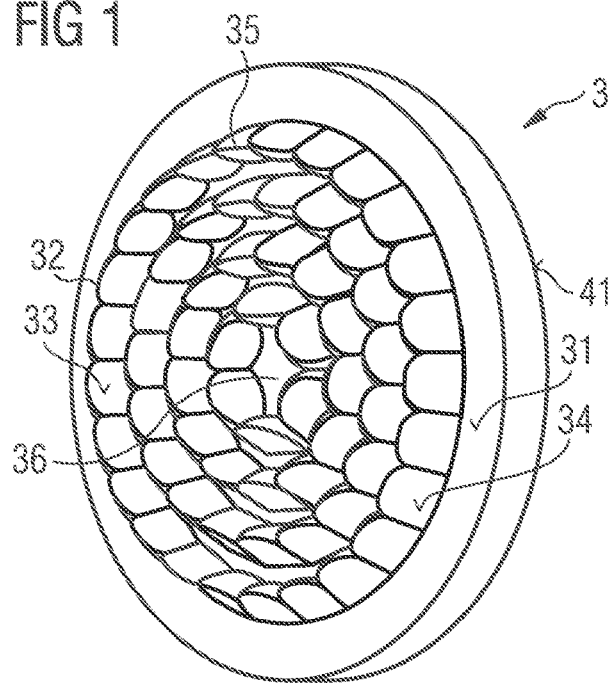
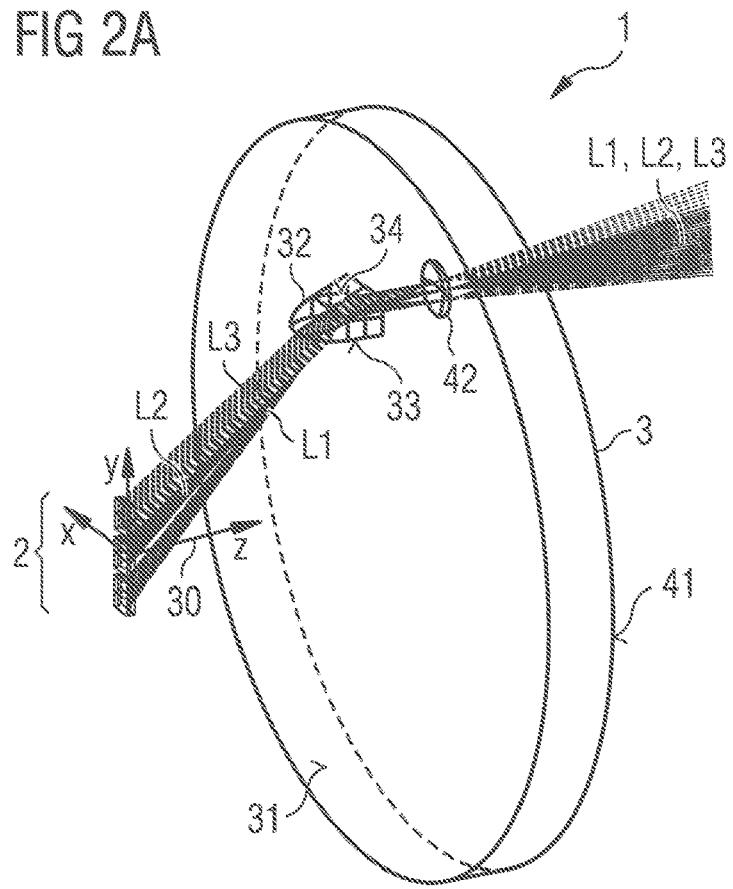

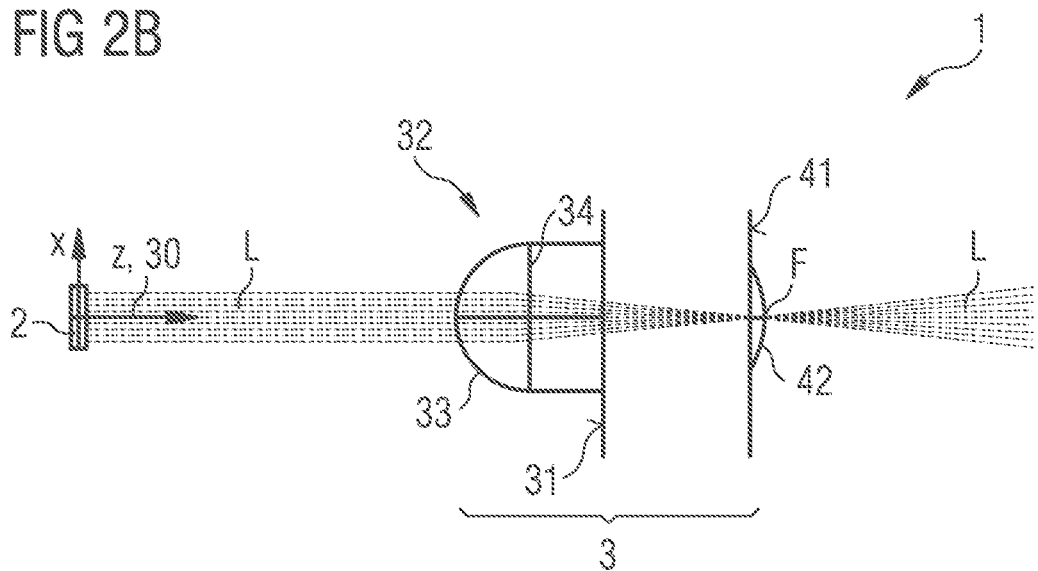
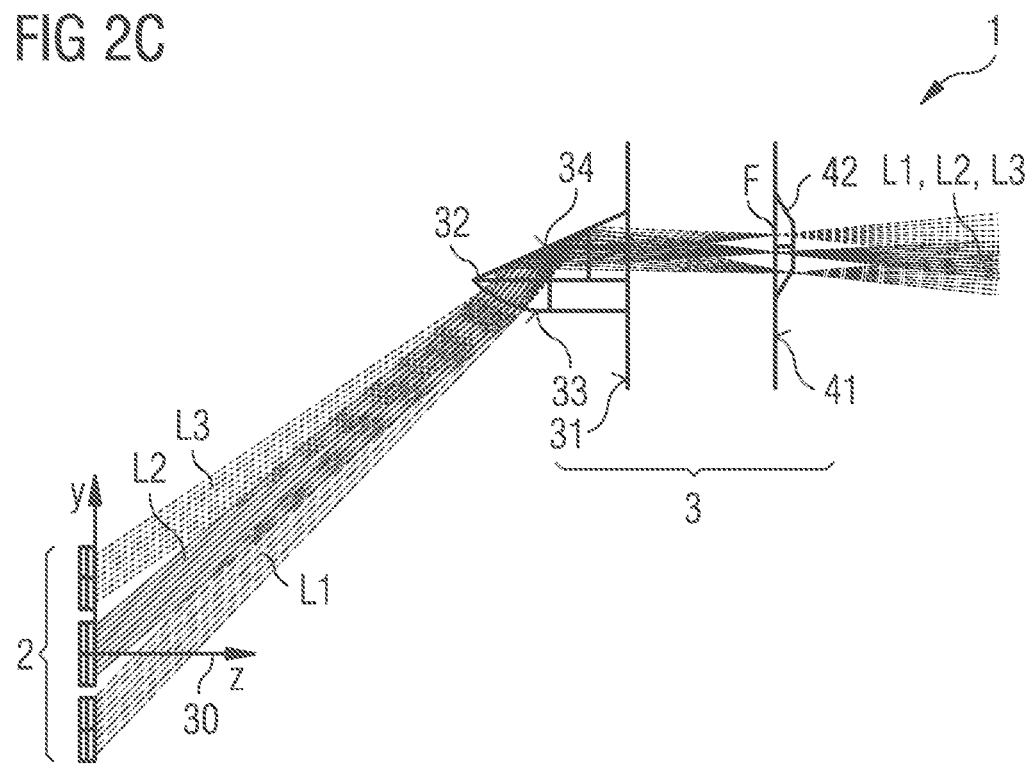

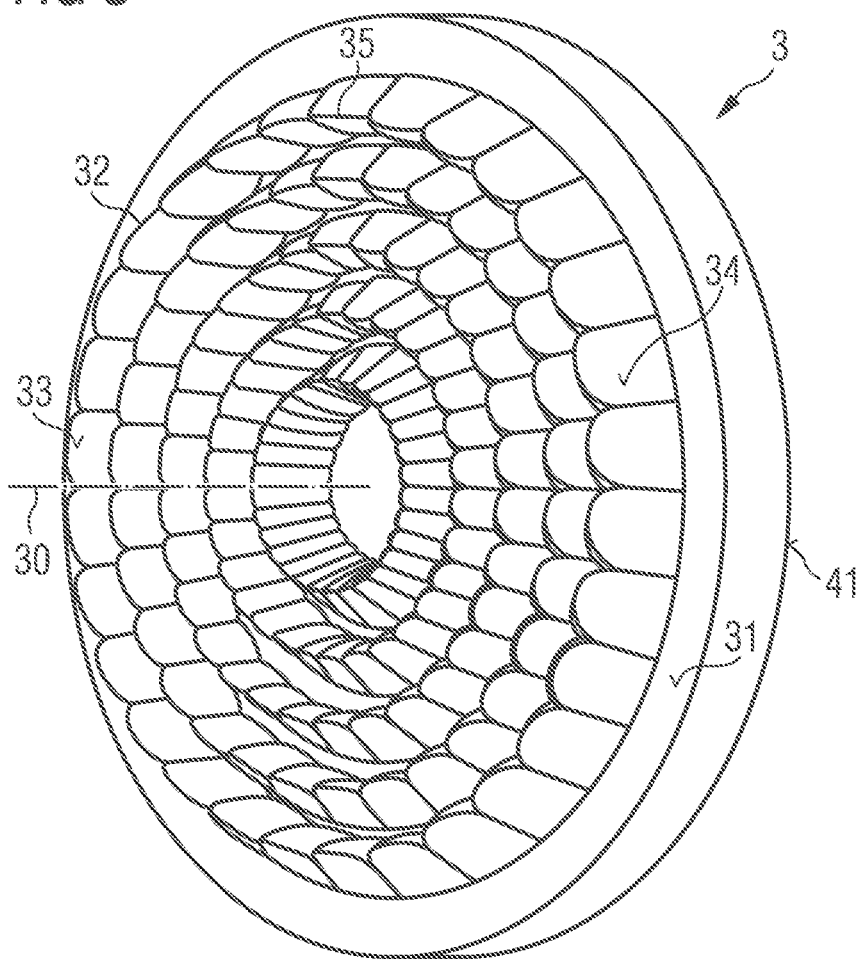

LENS AND FLASH

This patent application is a national phase filing under section 371 of PCT/EP2017/062909, filed May 29, 2017, which claims the priority of German patent application 10 2016 109 917.1, filed May 30, 2016, each of which is incorporated herein by reference in its entirety.

TECHNICAL FIELD

The invention relates to a lens. The invention further relates to a flash light having such a lens.

SUMMARY OF THE INVENTION

Embodiments provide a lens configured to achieve efficient color mixing at a low overall height.

According to at least one embodiment, the lens is designed to reduce a divergence of light of a light source. This means that, when the lens is used as intended, the lens acts effectively as a converging lens. In this case, it is not necessary for the lens to be designed for imaging the light source into an optical far field. For example, the lens reduces a divergence angle of the light source by at least 25% or 50%, corresponding to a halving. The angle of divergence is, for example, the continuous angle range within which a direction-dependent light intensity is at least 50% of a maximum intensity. In other words, the angle of divergence can be an intensity half-value angle.

According to at least one embodiment, the lens has a light entrance side. Intentionally, the light entrance side faces the light source.

According to at least one embodiment, the light entrance side is provided with a plurality of Fresnel elements. The Fresnel elements are formed, for example, by individual teeth, points or rings. The lens is thus a Fresnel lens.

According to at least one embodiment, the lens has an optical axis. The optical axis can be a central axis and/or an axis of symmetry of the lens. Preferably, a maximum intensity of the lens is emitted along the optical axis. The optical axis can be oriented perpendicular to the light entrance side and/or to the light exit side or also can run obliquely to the light entrance side and/or to the light exit side.

According to at least one embodiment, the Fresnel elements each have an entrance surface. Intentionally, the light of the light source enters the associated Fresnel element through the entrance surface, in particular exclusively through the respective entrance surface.

According to at least one embodiment, the entrance surface is shaped locally or entirely in a convex manner. This means that the entrance surface has the effect of a converging lens for the light entering the lens so that a divergence is reduced. The entrance lenses of the Fresnel elements each have a first focal length. All the entrance lenses can have the same first focal length, but the entrance lenses preferably have different first focal lengths.

According to at least one embodiment, the lens comprises a light exit side which is opposite the light entrance side. A plurality of exit lenses is formed on the light exit side. The exit lenses have a second focal length. In other words, the exit lenses are converging lenses. Each exit lens can have a specific second focal length; different exit lenses can have the same or different second focal lengths.

According to at least one embodiment, the Fresnel elements and the exit lenses are optically uniquely associated with one another. In other words, the light received by a specific Fresnel element from the light source is forwarded as intended to exactly one of the exit lenses.

According to at least one embodiment, the Fresnel elements each have a deflection surface which is optically directly downstream of the entrance surface. In other words, the light passes through the entrance surface into the lens and, as intended, is guided to the deflecting surface.

According to at least one embodiment, the deflecting surface is configured to guide the light, which enters the lens through the light entrance surface, to the associated exit lens by means of total reflection. A reflection at the deflection surface takes place at an interface of the lens towards a surrounding medium, wherein the surrounding medium is preferably a gas such as air or an evacuated region. The deflection surface is preferably free of a mirror such as a metal layer or a Bragg mirror.

According to at least one embodiment, the entrance surfaces and the respective associated exit lenses lie in their respective mutual focal point. This preferably applies with a tolerance of at most 20% or 10% or 5% of the first focal length and/or of the second focal length and/or of a maximum value or of a minimum value of the first and the second focal lengths. In other words, a parallel beam bundle impinging on the entrance surface is focused onto the exit lens. Conversely, a parallel beam bundle which impinges on the exit lens is focused onto the entrance surface. In other words, the exit lens and the entrance lens can be a Köhler lens pair.

According to at least one embodiment, at least 50% or 80% or 90% or all of the pairs of entrance surfaces and associated exit lenses are designed as Köhler lens pairs, in particular in relation to the Fresnel elements or in relation to all optical elements of the lens. In other words, it is possible for a small number of lens pairs that the condition according to which the entrance surfaces and the respective associated exit lenses lie in their respective mutual focal point is not satisfied. This can be caused, for example, by production tolerances or production faults, for example, during injection molding of the lens.

In at least one embodiment, the lens is designed to reduce a divergence of light from a light source. The lens comprises a light entrance side with a plurality of Fresnel elements and a light exit side with a plurality of exit lenses. Furthermore, the lens has an optical axis. The Fresnel elements and the exit lenses are optically uniquely associated with one another. The Fresnel elements each have an entrance surface which is shaped convexly and which forms an entrance lens with a first focal length. The exit lenses of the light exit side have a second focal length. Furthermore, the Fresnel elements each have a deflection surface which is optically directly downstream of the entrance surface and which is designed to guide light that entered the lens through the light entrance side to the associated exit lens by means of total reflection. The entrance surfaces and the associated exit lenses lie, with a tolerance of at most 20% of the first and/or the second focal length, mutually in their respective focal points.

Depending on the homogeneity of a light source, conventional Fresnel lenses can generate inhomogeneous brightness distributions and/or color distributions in the optical far-field, since such lenses generally permit no light mixing or only slight light mixing, in particular in the small-angle range. An alternative option for achieving an improved color mixing is to use light-scattering elements, also referred to as diffusers. However, the light scattering of a diffuser counteracts the collimating function of a lens and can lead to glare.

Due to the combination of the exit lens and the convex entrance surface in the lens described here, an efficient reduction in divergence can be achieved with simultaneous efficient color mixing. Thus, in the lens described here, a functional combination of a Fresnel lens for focusing and of a Köhler integration for light mixing in a component having a low overall height and low material thickness is carried out, wherein the lens is designed as a monolithic body.

In other words, the exit lens and the entrance surface form a lens pair, wherein the two lenses are located in their mutual focal positions. The exit lens maps the brightness distribution and/or the color distribution on the entrance surface into the optical far field and vice versa. The present lens thus represents a Köhler integrator which has a plurality of lens pairs, whose images overlap each other in the far field so that an efficient light mixing takes place.

In each lens pair, an angular extension of the emergent light is preferably at most as large as that of the incident light. There is then no or no significant light collimation through the lens pair. The reduction of the divergence can be attributed predominantly or exclusively to the deflection surface. Due to the total internal reflection at the deflection surface, large deflection angles are possible with short focal lengths. An imaging of the light distribution by means of the entrance surface onto the exit lens thus takes place indirectly via the deflection surface.

According to at least one embodiment, the Fresnel elements of the light entrance side are arranged concentrically in a plurality of rings around the optical axis. In this case, each of the rings is preferably composed of a plurality of Fresnel elements. The Fresnel elements can be arranged closely next to one another along the ring, so that, for example, adjacent Fresnel elements touch each other along the ring.

According to at least one embodiment, the Fresnel elements are of equal size. This applies in particular over all the rings, so that the Fresnel elements of adjacent rings can also be of equal size. In particular, "the same size" means that a size of the individual Fresnel elements deviates from a mean size, averaged over all Fresnel elements, preferably by at most 20% or 10% or 5%.

According to at least one embodiment, all rings comprise the same number of Fresnel elements. Since a circumference of the rings increases in the direction away from the optical axis, in this case, a size of the Fresnel elements also increases in the direction away from the optical axis.

According to at least one embodiment, the entrance surfaces of the Fresnel elements are curved convexly both in the tangential direction to the rings and in the direction parallel to the optical axis. In other words, the entrance surfaces have a curvature along two directions oriented perpendicular to one another. In this case, the entrance surfaces are spherical or alternatively aspherical or designed as a free form.

According to at least one embodiment, the Fresnel elements are formed by continuous concentric rings. The rings can have a constant height along their entire circumference. Viewed from the top of the light exit side, the Fresnel elements can thus be designed as circular rings. In this case, the entrance surfaces are preferably split in a manner similar to rolled-up cylindrical lenses. A curvature in the tangential direction is then approximately negligible with regard to the reduction in divergence through the lens, particularly in the case of rings which are located further away from the optical axis.

According to at least one embodiment, the exit lenses, viewed in a plan view of the light exit side, are formed either by ellipses, circles or by circular rings. In the case of circular-ring-shaped exit lenses, the Fresnel elements are preferably formed as continuous concentric circular rings.

According to at least one embodiment, the Fresnel elements are formed by structures running straight in a plan view of the light entrance side. Adjacent Fresnel elements are preferably oriented parallel to one another. In this case, the exit lenses are preferably formed by cylindrical lenses.

According to at least one embodiment, the exit lenses, viewed in a plan view of the light exit side, extend congruently with the Fresnel elements on the light entrance side. In particular, in plan view, exit lenses do not overlap with Fresnel elements which are not associated with the respective exit lens.

According to at least one embodiment, the lens is mechanically self-supporting. This means that, across the light entrance side and across the light exit side, no further supports or stabilizing components are required.

According to at least one embodiment, the lens is a flat lens, that is, with a planar basic shape. This means, for example, that a thickness of the lens is at most 20% or 10% or 5% of the average diameter of the light entrance side. Alternatively or additionally, the lens can be curved in a convex or concave manner, for example, similarly to a bowl or a hemisphere. Furthermore, it is possible for the basic shape of the lens to correspond to a free form.

According to at least one embodiment, a refractive index of a material of the lens is at least 1.4 or 1.5 and/or at most 1.8 or 1.7 or 1.65. This applies in particular to a wavelength of 532 nm and at a temperature of 300 K. The lens is made, preferably in one piece and homogeneously, of a polycarbonate, of polymethyl methacrylate, of a silicone, an epoxy, a silicone-epoxy hybrid material or a glass, for example.

According to at least one embodiment, all the exit lenses have the same height. This preferably applies with a tolerance of at most 5% or 2% or 1% or 0.3% of the average diameter of the light entrance side. In particular, all the points of the exit lenses which are furthest away from the light entrance side can lie in a common plane.

In addition, a flash light is specified. The flash light comprises a lens, in particular exactly one lens, as specified in connection with one or more of the above-mentioned embodiments. Features of the lens are therefore also disclosed for the flash light and vice versa.

In at least one embodiment, the flash light is configured for a mobile image recording device such as a smartphone or a tablet. The flash light contains at least one light source which generates polychromatic, mixed-colored light during operation. The lens is arranged directly downstream of the light source. The lens reduces a divergence of the light of the light source by at least a factor of 1.5 or 2 or 3, in relation to the intensity half-value angle.

According to at least one embodiment, the lens is located close to the light source, in particular close to a main emission side of the light source. A distance between the lens and the main emission side is, for example, at most 40% or 20% or 10% of the average diameter of the light entrance side. Alternatively or additionally, this distance along the optical axis is at least 20% or 40% and/or at most 95% or 80% or 60% of the average edge length of the light source.

According to at least one embodiment, the lens and the light source are arranged centrally with respect to one another along the optical axis. The main emission side and/or the light entrance side can be oriented perpendicular to the optical axis.

According to at least one embodiment, the light source, or one of the light sources, or all light sources, is/are formed by light-emitting diodes. The light-emitting diodes can have a phosphor, by means of which the main emission side is formed. Alternatively, the light-emitting diodes are single-color emitting diodes, for example, green, blue or red light-emitting diodes. In particular in the last-mentioned case, the light-emitting diodes are free of a phosphor.

According to at least one embodiment, the flash light comprises a plurality of light sources. The light sources are preferably arranged next to one another. A distance between adjacent light sources is preferably at most 1% or 0.5% or 0.1% of the average diameter of the light entrance side. In other words, the light sources can be located close to one another, for example, in the direction perpendicular to the optical axis.

According to at least one embodiment, at least two different types of light sources are present, which each generate light of a specific color and different from each other during operation. The light sources can generate different colors in pairs. In total, mixed-colored, different-colored light is generated. The lens is designed to achieve a mixing of the different colors from the light sources.

According to at least one embodiment, at least 50% or 80% or 90% of the light generated by the at least one light source passes into the lens via the entrance surfaces of the Fresnel elements. In this way, a particularly efficient light mixing can be achieved.

According to at least one embodiment, the mean edge length of the main emission side or an average edge length of a region in which the light sources are arranged closely next to one another amounts to at most 20% or 10% of the average diameter of the light entrance side. This means that the at least one light source, relative to the lens, is to be regarded as a point light source.

According to at least one embodiment, during operation, the Fresnel elements are configured to receive an equally large luminous flux from the light source and to direct said luminous flux to the respective exit lenses. Accordingly, the exit lenses preferably emit in each case an equally large luminous flux during the operation of the light source. "Equally large" preferably means with a deviation of at most 25% or 15% or 5% from a luminous flux averaged over all Fresnel elements.

According to at least one embodiment, the Fresnel elements have at least partly different heights, in the direction parallel to the optical axis. In this way, it is possible that the Fresnel elements each receive an equally large luminous flux from the light source, in particular Fresnel elements further remote from the optical axis.

According to at least one embodiment, the light entrance side is configured as a converging lens in the region above the light source, in particular on the optical axis. The converging lens, which, viewed in a plan view, can be designed as a circular surface or ellipse, covers the light source completely or only partially when viewed in plan view. A corresponding converging lens can alternatively or additionally be provided on the light exit side.

According to at least one embodiment, the central converging lens is surrounded all around by further converging lenses. Curvatures and orientations of all further converging lenses in the central region of the Fresnel lens can be of the same design. Alternatively, curvatures and/or orientations of the further converging lenses can differ from one another. For example, further converging lenses can have the same curvature and orientation at the same distance from the optical axis of the lens, while further converging lenses vary in their curvature and/or orientation with increasing distance away from the optical axis.

According to at least one embodiment, the converging lens is penetrated centrally by the optical axis. This preferably applies equally to the main emission side of the light source.

According to at least one embodiment, the converging lens is surrounded all around by the Fresnel elements. The converging lens can thus be enclosed by the Fresnel elements.

According to at least one embodiment, main emission directions of individual light cones of each lens pair, each formed by one of the entrance surfaces and of the corresponding exit lens, point in the same direction, for example, parallel to the optical axis or in the direction towards a common point in the optical far field. The lens can thus have a common focal point. This focal point can lie on or off the optical axis, for example, in order to form a focal ring.

According to at least one embodiment, the main emission directions of the light cones of the individual lens pairs differ from one another. Thus, the lens pairs can lead the associated light in individually different directions. In this case, the lens does not have a common focal point.

According to at least one embodiment, the deflection surface of the Fresnel elements is formed in planar fashion. Viewed in particular in cross section parallel to the optical axis, the deflection surfaces then run straight. Alternatively, the deflection surfaces can be curved, in particular convexly curved, in order to achieve a light collection.

Alternatively, it is possible for only the deflection surface to be convexly curved instead of the entrance surface of the Fresnel elements. In this case, the entrance surface of the Fresnel elements can be flat.

With the lens described here, at a low height of the optical system, a light mixing without additional optical components and thus without further optical losses at optical boundary layers can be achieved. A more efficient light mixing can thus be achieved in comparison with conventional Fresnel lenses, and light sources with different colors and with different brightnesses can be combined with one another in a light source arrangement.

The lens described here can be used not only in a flash light, but also, for example, in general lighting, for example, as a flood light, also referred to as a spotlight. Likewise, such lenses can be used in stage illumination, for example, as viewfinder headlights. Furthermore, it is possible to use such lenses in signal lights, for example, in traffic lights. Particularly preferably, light-emitting diodes, LEDs for short, are used as light sources for the lenses.

BRIEF DESCRIPTION OF THE DRAWINGS

In the following, a lens described here and a flash light described here are explained in more detail with reference to the drawing on the basis of exemplary embodiments. Identical reference signs indicate the same elements in the individual figures. However, no relationships to scale are illustrated; rather, individual elements can be represented with an exaggerated size in order to afford a better understanding.

In the Figures:

FIGS. 1, 3, 4 and 5 show schematic perspective representations of exemplary embodiments of lenses;

FIGS. 2A to 2C, 9 and 10 show schematic representations of exemplary embodiments of flash lights with lenses;

DETAILED DESCRIPTION OF ILLUSTRATIVE EMBODIMENTS

Figure 4:
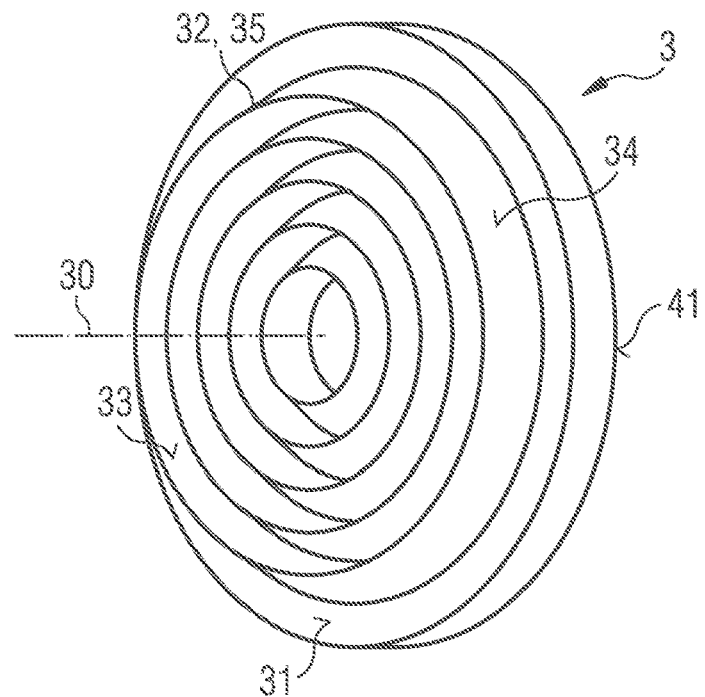

FIG. 1 shows an exemplary embodiment of a lens 3. The lens 3 comprises a light entrance side 31 and a light exit side 41 opposite thereto. On the light entrance side 31, there is a plurality of Fresnel elements 32, which are arranged along rings 35.

The Fresnel elements 32 are of equal size across all rings and each have an entrance surface 33 which is convexly curved and which forms an entrance lens. Furthermore, the Fresnel elements 32 each have a deflection surface 34. The deflection surface 34 can be planar.

In addition, a converging lens 36 is provided in a central region of the light entrance side 31. The converging lens 36 is surrounded all around by the Fresnel elements 32.

Since the Fresnel elements 32 are all of the same size, a number of Fresnel elements 32 per ring 35 increases towards the outside. A minimum number of Fresnel elements 32 of the innermost ring 35 is preferably four or five or six.

The light exit side 41 is provided with exit lenses, not shown in FIG. 1. There is a clear assignment between the Fresnel elements 32 and the exit lenses, see also FIG. 2.

FIG. 2 shows an exemplary embodiment of a flash light 1 comprising such a lens 3, see the schematic perspective representation in FIG. 2A and the sectional representations in FIGS. 2B and 2C.

FIG. 2A schematically illustrates a Fresnel element 32 of the lens 3. The Fresnel element 32 is designed as illustrated in conjunction with FIG. 1. Furthermore, the associated exit lens 42 is drawn in FIG. 2. In order to simplify the representation in FIG. 2, only one Fresnel element 32 and only one exit lens 42 are drawn on the light entrance side 31 and on the light exit side 41. Both the light entrance side 31 and the light exit side 41 are preferably filled with the Fresnel elements 32 and the exit lenses 42, see FIG. 1.

The flash light 1 further comprises a light source 2. The light source 2 is formed by a plurality of light emitting diodes which emit light L1, L2, L3 of different colors. For example, blue light L1, red light L2 and green light L3 is emitted by the individual light-emitting diodes. A main emission direction of the light source 2 runs along an optical axis 30 in z-direction. The lens 3 is oriented parallel to an xy plane, as is the light source 2.

The light L1, L2, L3 emanating from the light-emitting diode chips of the light source 2 reaches the entrance surface 33 of the relevant Fresnel element 32. On the convexly curved entrance surface 33, the entering light is focused onto the exit lens 42, more precisely onto an outer surface of the exit lens 42, said outer surface forming part of the light exit side 41. Thus, a focal point F of the entrance surface 33 lies on the exit lens 42. Furthermore, a focal point of the exit lens 42 lies on the entrance surface 33. In other words, the entrance surface 33 and the exit lens 42 lie in their mutual focal points F.

The deflection surface 34 is optically located between the exit lens 42 and the entrance surface 33. The deflection surface 34 effects a deflection of the light entering the lens 3 via the entrance surface 33 by means of total reflection. Deviating from the representation in FIG. 2, it is possible, as in all other exemplary embodiments, that the deflection surface 34 also has an in particular convex curvature. Furthermore, it is alternatively possible for only the deflection surface 34 to be convexly curved instead of the entrance surface 33, so that the entrance surface 33 can be formed in planar fashion. In this case, the deflection surface 34 and the exit surface 42 lie in their mutual focal points.

Due to the fact that the entrance surface 33 and the exit lens 42 lie in their mutual focal points F, an efficient light mixing is already effected at a short distance from the light exit side 41, see in particular FIG. 2C. The individual beam bundles of light L1, L2, L3 are superimposed in the optical far field so that an efficient light mixing and a compensation of intensity inhomogeneities is made possible.

FIG. 3 shows a further exemplary embodiment of the lens 3 for a flash light 1. In contrast to the illustration in FIG. 1, all rings 35 have the same or approximately the same number of Fresnel elements 32. The Fresnel elements 32, which are located on different rings 35, thus have different sizes. As a result, the exit lenses (not shown in FIG. 3) on the light exit side 41 are also of different sizes. Both a size of the Fresnel elements 32 and of the exit lenses increases towards the outside in the direction away from the optical axis 30.

In the exemplary embodiment of the lens 3 as shown in FIG. 4, each of the rings 35 is formed by exactly one of the Fresnel elements 32. The Fresnel elements 32 are thus designed in the shape of rings. The same applies to the non-drawn exit lenses 42.

Figure 5:
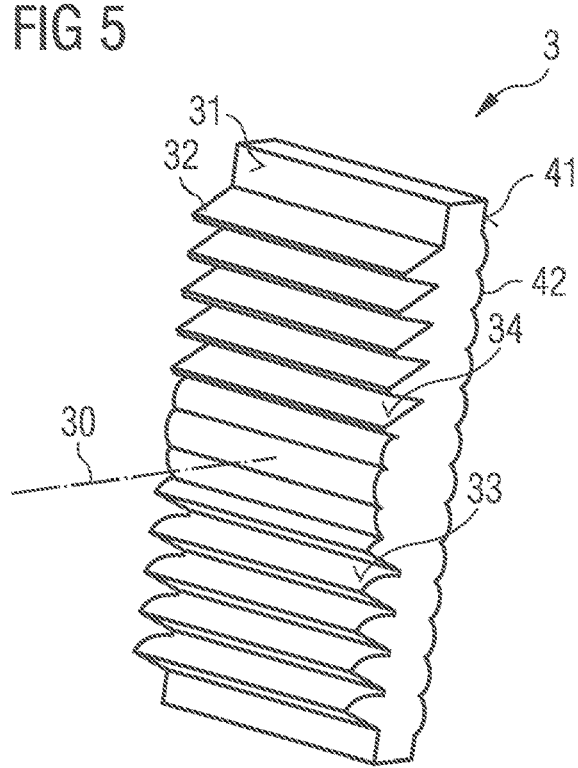

In the exemplary embodiment of the lens 3 of FIG. 5, the Fresnel elements 32 are realized by straight strips. The exit lenses 42 also extend as strips along the light exit side 41. In this case, the exit lenses 42 and the Fresnel elements 32, as well as in all other exemplary embodiments, can be arranged congruently or approximately congruently, viewed in a plan view of the light exit side 41.

The exemplary embodiments of FIGS. 3 to 5, too, have the optical properties as explained in conjunction with FIG. 2 in the case of the lens 3 of FIG. 1. In addition, such lenses 3 can be produced efficiently by means of injection molding and/or by means of extrusion.

Figure 6:
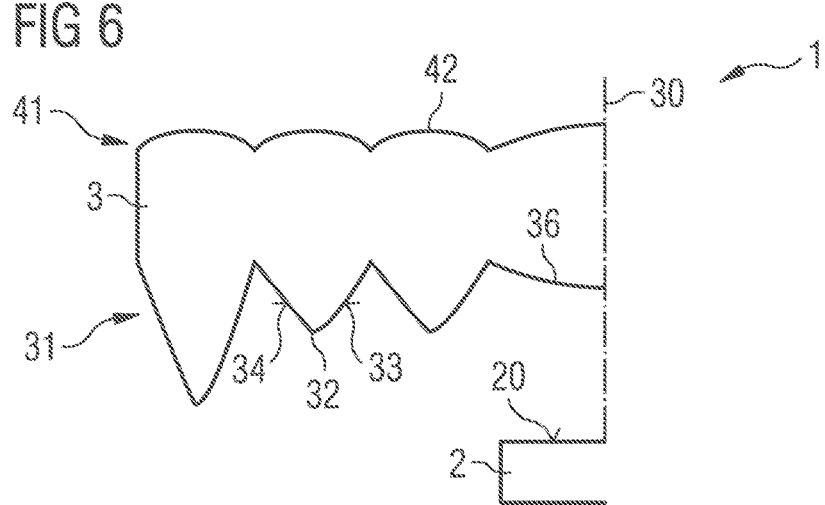
FIGS. 6 to 8 show schematic sectional representations of flash lights with lenses.
Figure 7:
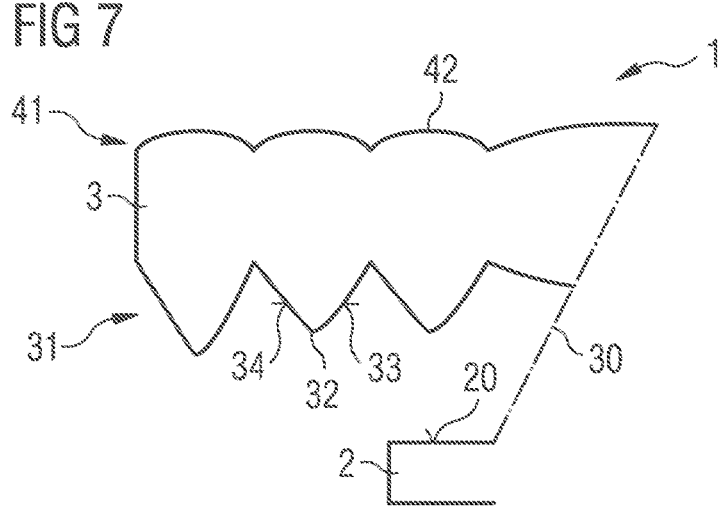
Figure 8:
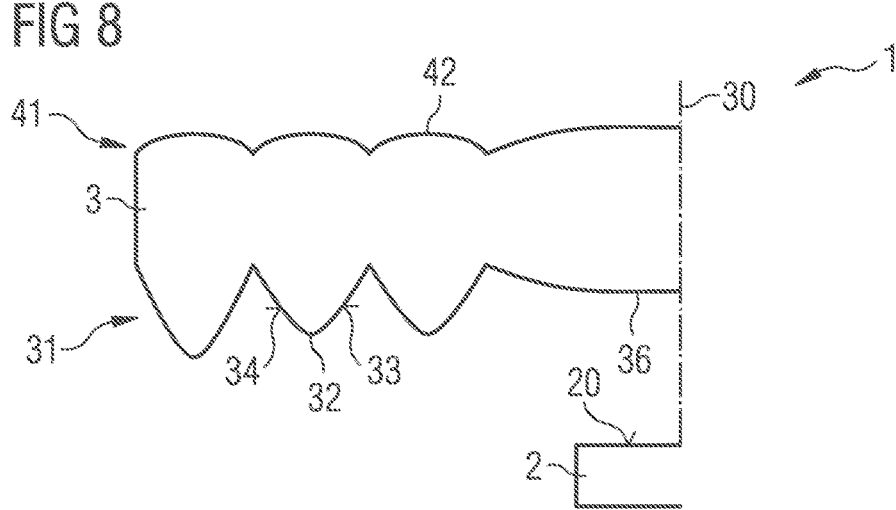

Further exemplary embodiments of the flash light 1 are shown in FIGS. 6 to 8. Different variants of the lens 3 are explained. The corresponding variants of the lens 3 can in each case be applied to the exemplary embodiments of the lens 3, as illustrated in FIGS. 1, 3, 4 and 5.

According to FIG. 6, the Fresnel elements 32 have heights increasing in the direction away from the optical axis. Alternatively or additionally, the converging lens 36 which is penetrated by the optical axis 30 is approximately of the same size as a main emission side 20 of the light source 2 facing the lens 3, viewed in plan view. Deviating from the representation in FIG. 6, the light source 2 can be formed from a plurality of light-emitting diodes arranged closely next to one another, analogously to FIG. 2.

In the exemplary embodiment of FIG. 7, the exit lenses 42 and the Fresnel elements 32 have heights of equal size or of approximately equal size. Furthermore, FIG. 7 illustrates that the optical axis 30 runs obliquely to the light entrance side 31 and to the light exit side 41, as is likewise possible in all other exemplary embodiments. In this case, the optical axis 30 does not necessarily represent an axis of symmetry of the lens 3. In contrast to the representation of FIG. 7, the main emission side 20 can be oriented perpendicularly or approximately perpendicularly to the optical axis 30.

FIG. 8 illustrates that both the deflection surfaces 34 and the entrance surfaces 33 of the Fresnel elements 32 are convexly curved. Alternatively or additionally, according to FIG. 8 the converging lens 36 has a significantly larger diameter than the main emission side 20. For example, the mean diameter of the converging lens 36 exceeds an average diameter of the main emission side 20 by at least a factor of 1.5 or 2 or 3.

Figure 9:
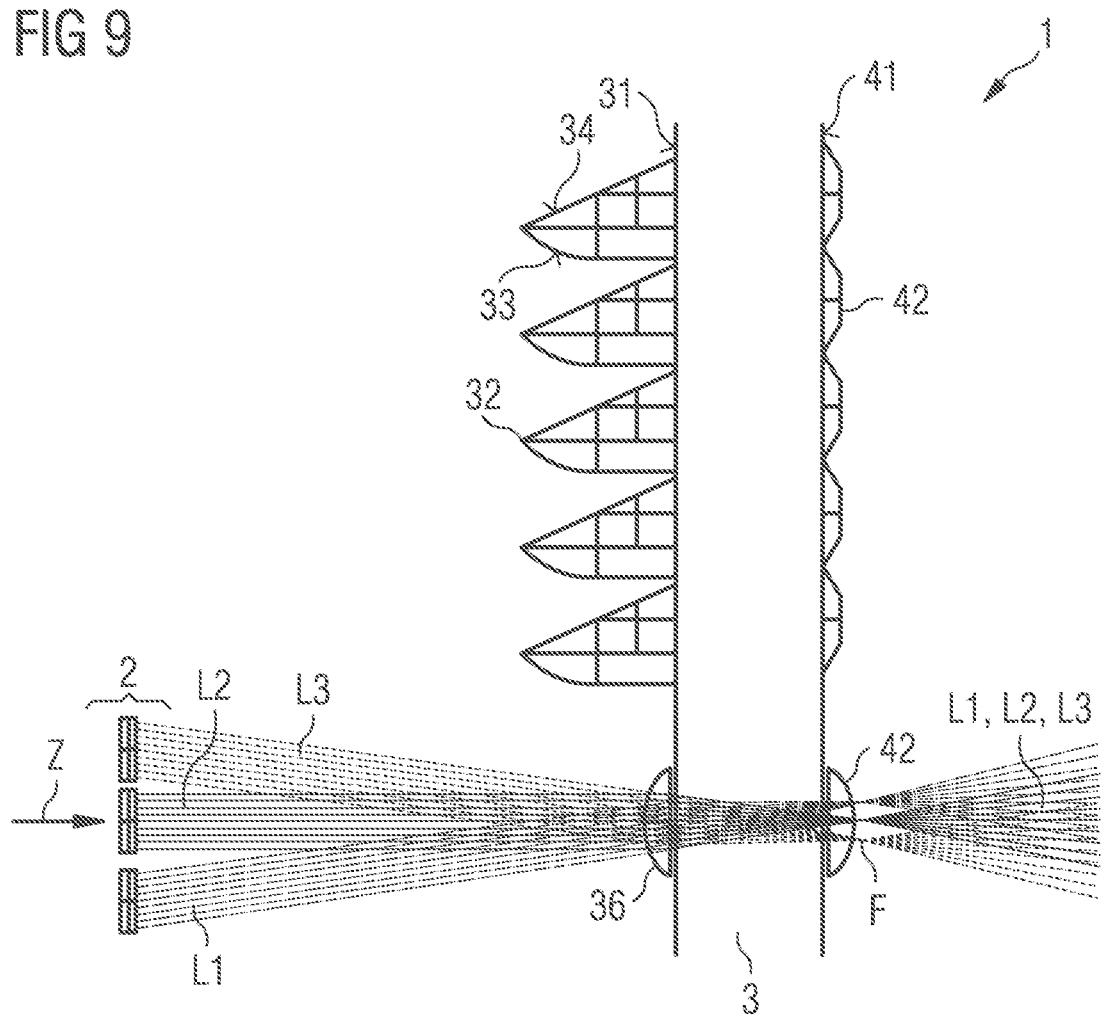

In FIG. 9, the mode of operation of the converging lens 36 and of the associated exit lens 42 is illustrated in a schematic sectional illustration. The converging lens 36 and the associated exit lens 42 also lie in their mutual focal points F so that an efficient light mixing is achieved.

Such lenses 3, as illustrated in FIGS. 1 and 3 to 8, can be used not only in flash lights 1, but also in lights for general lighting, in headlights and/or in signal lights.

Figure 10:
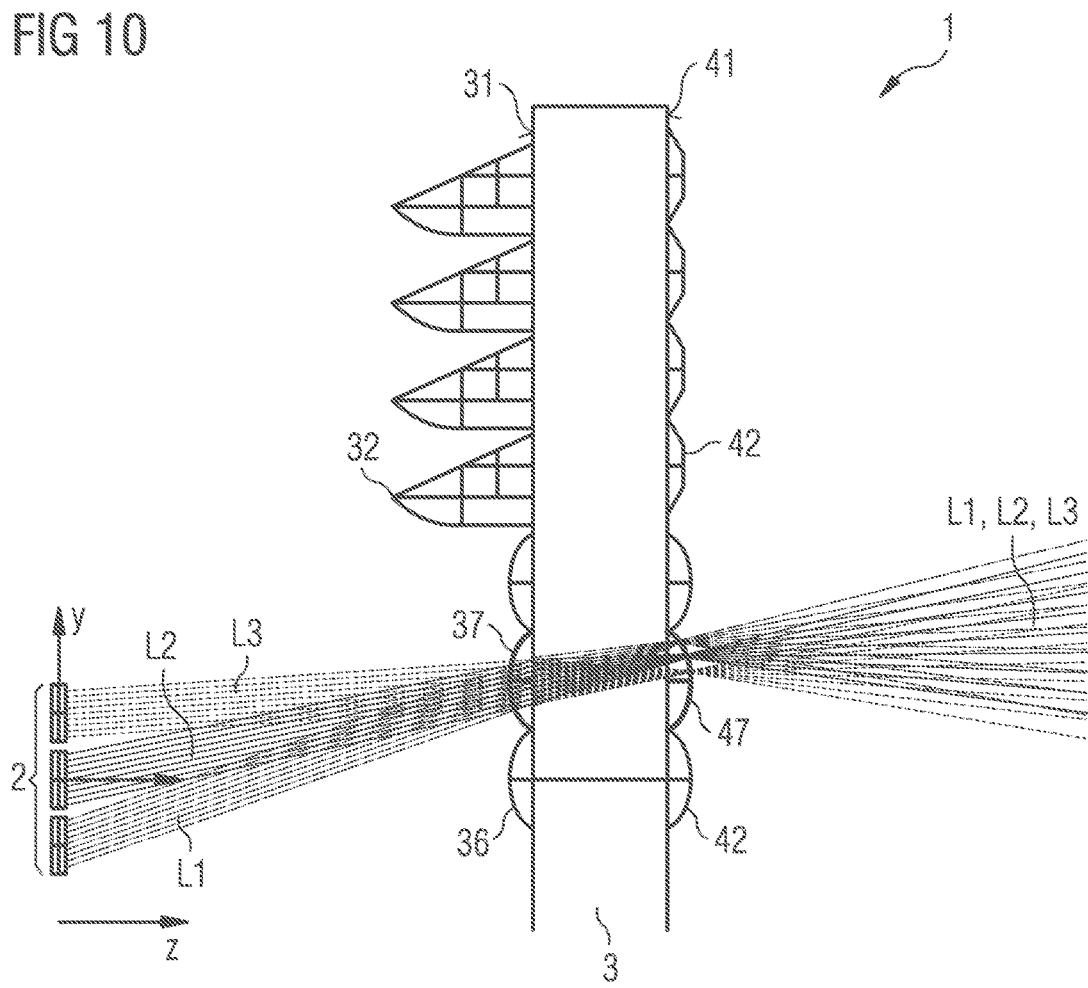

Furthermore, it is possible in each case, as in the exemplary embodiment of FIG. 10, that between the central collecting lens 36, 42, which is designed as a circular surface when seen in plan view, and the Fresnel elements 32 additional pairs of further converging lenses 37, 47 are present. The further pairs 37, 47 can be designed as Köhler lens pairs, as shown in FIG. 10, so that the entrance surfaces and the respective associated exit lenses lie in their respective, mutual focal points. In this case, the further pairs of lenses 37, 47 can be designed as rings, analogously to FIG. 4, or as teeth, analogously to FIGS. 1 to 3. Deviating from FIG. 10, such pairs of further converging lenses 37, 47 do not necessarily have to be Köhler lens pairs.

Figure 11:
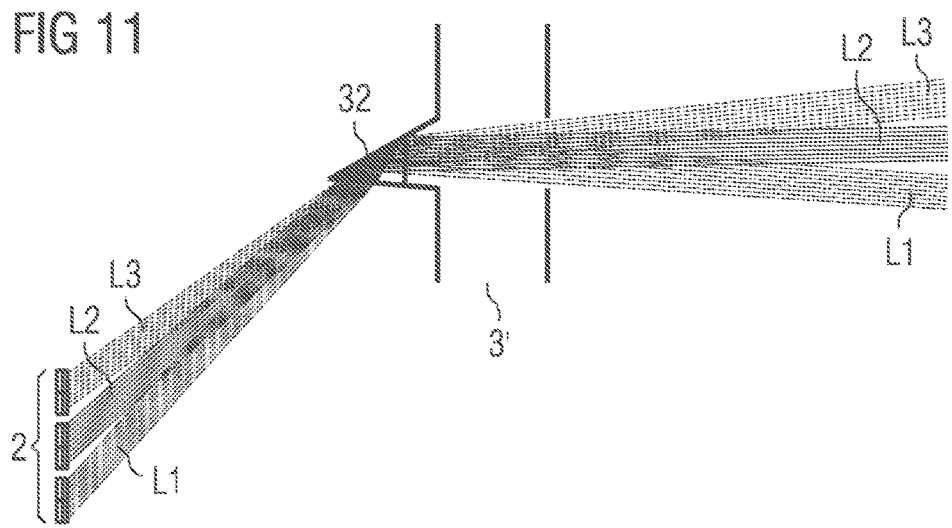
FIG. 11 shows a schematic sectional illustration of a luminaire with a conventional Fresnel lens.

In FIG. 11, a modification is shown in a schematic sectional representation. According to FIG. 11, the Fresnel element 32 has flat input surfaces and deflection surfaces. As a result, a separation of the light L1, L2, L3 of the light-emitting diodes 2 takes place in the optical far field, contrary to what is the case in the embodiments of the lens 3.

The invention described here is not restricted by the description on the basis of the exemplary embodiments. Rather, the invention encompasses any new feature and also any combination of features, which includes in particular any combination of features in the patent claims, even if this feature or this combination itself is not explicitly specified in the patent claims or exemplary embodiments.

The invention claimed is:

1. A lens for reducing a divergence of light of a light source comprising:
    a light entrance side having a plurality of Fresnel elements;
    a light exit side opposite the light entrance side, wherein the light exit side has a plurality of exit lenses having a second focal length; and
    an optical axis,
    wherein the Fresnel elements and the exit lenses are optically associated with one another in a one-to-one manner,
    wherein each Fresnel element has an entrance surface which is convex in shape and which forms an entrance lens having a first focal length,
    wherein each Fresnel element has a deflection surface arranged directly downstream of the entrance surface,
    wherein the deflection surface is configured to deflect the light which entered the lens through the entrance surface by total internal reflection towards an associated exit lens, and
    wherein, with a tolerance of at most 20% of the first and the second focal lengths, each entrance surface and the associated exit lens are located in the interrelated focal points.

2. The lens according to claim 1,
    wherein the Fresnel elements are arranged concentrically in a plurality of rings around the optical axis, which is a central axis of the lens, and
    wherein each ring is composed of a plurality of the Fresnel elements arranged closely next to one another.

3. The lens according to claim 2, wherein the Fresnel elements are of equal size across the rings.

4. The lens according to claim 2, wherein each ring comprises the same number of Fresnel elements so that a size of the Fresnel elements increases in a direction away from the optical axis.

5. The lens according to claim 2, wherein the entrance surfaces of the Fresnel elements have a convex curvature, both tangentially with respect to the rings as well as in a direction parallel to the optical axis.

6. The lens according to claim 1,
    wherein the Fresnel elements are formed by continuous concentric rings around the optical axis with a constant height, and
    wherein the exit lenses, viewed in a plan view of the light exit side, are formed by circular rings.

7. The lens according to claim 1,
    wherein the Fresnel elements, viewed in a plan view of the light entrance side, run straight and are arranged parallel to one another, and
    wherein the exit lenses, viewed in a plan view of the light exit side, run likewise straight and are arranged congruently with respect to the Fresnel elements.

8. The lens according to claim 1,
    wherein the lens is mechanically self-supporting,
    wherein a refractive index of a material of the lens is between 1.4 and 1.7 inclusive, at 532 nm and at 300 K, and
    wherein all the exit lenses have the same height, with a tolerance of at most 1% of a mean diameter of the light exit side.

9. A flash light for a mobile image recording device comprising:
    the lens according to claim 1; and
    at least one light source configurated to generate multi-colored light during operation,
    wherein the lens is arranged optically directly downstream of the light source and an average edge length of a main emission side of the light source is at most 20% of a mean diameter of the light entrance side,
    wherein the lens and the light source are arranged centrally with respect to one another along the optical axis of the lens,
    wherein the at least one light source comprises a light-emitting diode, and
    wherein a divergence of the light of the light source is reduced by the lens by at least a factor of 1.5, with reference to an intensity half-value angle.

10. The flash light according to claim 9,
    wherein the flash light comprises a plurality of the light sources arranged laterally next to one another,
    wherein each light source is configured to generate light of a particular color during operation, so that overall the multi-colored light is generated, and
    wherein the lens is configured to mix the different colors.

11. The flash light according to claim 9, wherein at least 80% of the light generated by the at least one light source enters the lens via the entrance surfaces.

12. The flash light according to claim 9, wherein each Fresnel element is configured to receive an equally large luminous flux from the light source during operation, with a deviation of at most 25% of a luminous flux averaged over all Fresnel elements.

13. The flash light according to claim 9,
wherein a distance between the light entrance side and the main emission side along the optical axis is at least 20% and at most 95% of an average edge length of the light source, and
wherein the Fresnel elements have at least partially different heights along the optical axis.

14. The flash light according to claim 9,
wherein the light entrance side is formed as a converging lens in a region above the light source, and
wherein the converging lens is centrally penetrated by the optical axis and is surrounded all around by the Fresnel elements.

* * * * *